(12) United States Patent
Landa et al.

(10) Patent No.: US 7,169,722 B2
(45) Date of Patent: *Jan. 30, 2007

(54) CLEAR GLASS COMPOSITION WITH HIGH VISIBLE TRANSMITTANCE

(75) Inventors: Ksenia A. Landa, Grosse Ile, MI (US); Leonid Landa, Grosse Ile, MI (US); Richard Hulme, Rochester Hills, MI (US); Scott V. Thomsen, Milford, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 369 days.

This patent is subject to a terminal disclaimer.

(21) Appl. No.: 10/667,975

(22) Filed: Sep. 23, 2003

(65) Prior Publication Data

US 2004/0121896 A1 Jun. 24, 2004

Related U.S. Application Data

(60) Continuation-in-part of application No. 10/457,552, filed on Jun. 10, 2003, now Pat. No. 6,949,484, and a continuation-in-part of application No. 10/336,859, filed on Jan. 6, 2003, which is a division of application No. 10/056,051, filed on Jan. 28, 2002, now Pat. No. 6,610,622.

(51) Int. Cl.
*C03C 3/087* (2006.01)

(52) U.S. Cl. ....................................... 501/71
(58) Field of Classification Search ................. 501/64, 501/71

See application file for complete search history.

(56) References Cited

U.S. PATENT DOCUMENTS

| | | | |
|---|---|---|---|
| 5,030,594 A | 7/1991 | Heithoff | |
| 5,214,008 A | 5/1993 | Beckwith et al. | |
| 5,240,886 A | 8/1993 | Gulotta et al. | |
| 5,264,400 A | 11/1993 | Nakaguchi et al. | |
| 5,308,805 A | 5/1994 | Baker et al. | |
| 5,346,768 A | 9/1994 | Winter et al. | |
| 5,558,942 A | 9/1996 | Itoh et al. | |
| 5,656,559 A | 8/1997 | Combes et al. | |
| 6,218,323 B1 | 4/2001 | Bretschneider et al. | |
| 6,235,666 B1 | 5/2001 | Cochran et al. | |
| 6,335,299 B1 | 1/2002 | Foguenne et al. | |
| 6,395,659 B2 | 5/2002 | Seto et al. | |
| 6,407,021 B1 | 6/2002 | Kitayama et al. | |
| 6,498,118 B1 | 12/2002 | Landa et al. | |
| 6,548,434 B2 | 4/2003 | Nagashima | |
| 6,610,622 B1 | 8/2003 | Landa et al. | |
| 6,844,280 B2 * | 1/2005 | Koyama et al. | 501/70 |
| 2003/0144126 A1 | 7/2003 | Kitayama et al. | |

FOREIGN PATENT DOCUMENTS

| | | | |
|---|---|---|---|
| EP | 1 116 699 | | 7/2001 |
| EP | 1 118 597 | | 7/2001 |
| EP | 1 281 686 | | 2/2003 |
| EP | 1 281 687 | | 2/2003 |
| EP | 1 291 330 | | 3/2003 |
| JP | 10-226534 | * | 8/1998 |
| JP | 11-60269 | | 3/1999 |
| WO | WO 95/13993 | | 5/1995 |
| WO | 01/66477 | * | 8/2001 |
| WO | WO 02/081395 | | 10/2002 |
| WO | WO 03/064342 | | 8/2003 |
| WO | WO 04/063106 | | 7/2004 |

OTHER PUBLICATIONS

"Ultraviolet-Absorbing Colorless Transparent Glass", Hidetoshi, JP11060269, vol. 1999, No. 88.

* cited by examiner

*Primary Examiner*—Karl Group
(74) *Attorney, Agent, or Firm*—Nixon & Vanderhye P.C.

(57) ABSTRACT

A high transmittance fairly clear/neutral colored glass composition is provided. An oxidizing agent(s) such as cerium oxide (e.g., $CeO_2$) or the like is added to the glass batch in order to realize very oxidized conditions (i.e., to significantly lower the redox of the resulting glass). As a result of the oxidizing agent(s) used in the batch, the iron is oxidized to a very low FeO (ferrous state) content. For example, this may result in a glass having a glass redox value of no greater than 0.12 (more preferably <=0.10; even more preferably <=0.08; and most preferably <=0.05) and a % FeO (i.e., ferrous content) of from 0.0001 to 0.05%. In certain example embodiments, in order to compensate for yellow or yellow-green coloration a small amount of cobalt (Co) may be provided in the glass to enable it to realize a more neutral color.

27 Claims, No Drawings

CLEAR GLASS COMPOSITION WITH HIGH VISIBLE TRANSMITTANCE

PRIORITY CLAIM

This application is a continuation-in-part (CIP) of U.S. patent application Ser. No. 10/336,859, filed Jan. 6, 2003, and Ser. No. 10/457,552, filed Jun. 10, 2003 (now U.S. Pat. No. 6,949,484), which is a Divisional of Ser. No. 10/056,051, filed Jan. 28, 2002 (now U.S. Pat. No. 6,610,622), the entire disclosures of which are hereby incorporated herein by reference.

BACKGROUND OF THE INVENTION

This invention relates to glass compositions and methods of making the same. More particularly, this invention relates to glass having high light transmittance in the visible range and/or fairly neutral color. Such glass compositions are useful, for example, in architectural windows, patterned glass applications, residential windows, furniture, solar cells, and/or automotive windows.

Glass that is fairly neutral or clear in color, and highly transmissive to visible light (e.g., at least 75% transmissive, or even more preferably at least 80% transmissive), is sometimes desirable. One way of achieving such a glass is to use very pure base glass materials (e.g., substantially free of colorants such as iron). However, base materials with a high degree of purity are expensive and thus not always desirable and/or convenient. In other words, for example, the removal of iron from glass raw materials has certain practical and/or economical limits.

As can be appreciated from the above, glass raw materials (e.g., silica, soda ash, dolomite, and/or limestone) typically include certain impurities such as iron. The total amount of iron present is expressed herein in terms of $Fe_2O_3$ in accordance with standard practice. However, typically, not all iron is in the from of $Fe_2O_3$. Instead, iron is usually present in both the ferrous state ($Fe^{2+}$; expressed herein as FeO, even though all ferrous state iron in the glass may not be in the form of FeO) and the ferric state ($Fe^{3+}$). Iron in the ferrous state ($Fe^{2+}$; FeO) is a blue-green colorant, while iron in the ferric state ($Fe^{3+}$) is a yellow-green colorant. The blue-green colorant of ferrous iron ($Fe^{2+}$; FeO) is of particular concern when seeking to achieve a fairly clear or neutral colored glass, since as a strong colorant it introduces significant color into the glass. Ferrous iron is typically a stronger colorant than ferric iron. Thus, while iron in the ferric state ($Fe^{3+}$) is also a colorant, it is of less concern when seeking to achieve a glass fairly clear in color.

In view of the above, it is apparent that there exists a need in the art for a new glass composition which enables a glass to have fairly clear color and/or high visible transmission, without having to resort to extremely pure (i.e., free of iron) glass raw materials.

U.S. Pat. No. 6,218,323 discloses a neutral colored high transmission glass which can achieve a visible transmission of at least 89%. In order to achieve these characteristics, the glass of the '323 patent requires a very low total iron (expressed herein as $Fe_2O_3$) content of 0.01 to 0.03%, and a standard glass redox ($FeO/Fe_2O_3$) of 0.25 to 0.35. However, in some instances it is difficult (e.g., expensive and/or impractical) to achieve such a low total iron content of 0.01 to 0.03%. Thus, it will be appreciated by those skilled in the art that there exists a need for a clear glass composition capable of achieving high visible transmission and relatively neutral color regardless of whether or not the total iron is in the very low 0.01 to 0.03% range.

BRIEF SUMMARY OF EXAMPLE EMBODIMENTS OF THE INVENTION

It is an object of this invention to provide a glass capable of achieving a high visible transmission (e.g., of at least about 85%, more preferably of at least about 88%, and most preferably at least about 90%).

It is another object of this invention to provide a glass capable of achieving a high visible transmission when including a total iron content (expressed herein as $Fe_2O_3$) from 0.01 to 0.2%. In certain example embodiments, the glass may have a total iron content of from 0.01 to 0.15%, more preferably from 0.02 to 0.12%, and most preferably from 0.04 to 0.10%.

In order to achieve a high visible transmission and/or fairly neutral color given such a total iron content, in certain example embodiments of this invention an oxidizing agent(s) such as cerium oxide (e.g., $CeO_2$) or the like is added to the glass batch in order to realize very oxidized conditions (i.e., to significantly lower the redox of the resulting glass). As a result of the oxidizing agent(s) used in the batch, the iron is oxidized to a very low FeO (ferrous state) content. This is advantageous since ferrous iron ($Fe^{2+}$; FeO) is a much stronger colorant than is ferric iron ($Fe^{3+}$). In certain example embodiments of this invention, the resulting glass has a glass redox value of no greater than 0.12 (more preferably <=0.10; even more preferably <=0.08; and most preferably <=0.05) and an % FeO (i.e., ferrous content) of from 0.0001 to 0.05% (more preferably from 0.0001 to 0.01%; most preferably from 0.001 to 0.008%).

In certain example embodiments of this invention, even given the above-listed ferrous content (% FeO) and low glass redox value, the glass may still realize a yellow or yellow-green coloration. In order to compensate for such coloration, a small amount of cobalt (Co) may be provided in the glass to enable it to realize a more neutral color in certain example embodiments of this invention. Thus, the use of the oxidizing agent(s) decolorizes in a chemical fashion, and the simultaneous use of Co in certain example embodiments decolorizes in a physical fashion.

Another object of certain example embodiments of this invention is to fulfill one or more of the above-listed objects.

In certain example embodiments of this invention, one or more of the above-listed objects and/or needs is/are fulfilled by providing a glass comprising: a base glass portion comprising:

| | |
|---|---|
| $SiO_2$ | 67 to 75% |
| $Na_2O$ | 10 to 20% |
| CaO | 5 to 15% |
| MgO | 0 to 8% |
| $Al_2O_3$ | 0 to 5% |
| $K_2O$ | 0 to 5 | a colorant portion comprising (or consisting essentially of):

| | |
|---|---|
| total iron (expressed $Fe_2O_3$): | 0.01 to 0.20% |
| cobalt oxide: | 0.1 to 15 ppm |
| chromium oxide: | 0 to 10 ppm |
| titanium oxide: | 0 to 0.5% |

-continued

| | |
|---|---|
| glass redox: | <=0.10 |
| % FeO: | 0.0001 to 0.05% | and wherein the glass has a visible transmission of at least about 85%.

In certain other example embodiments of this invention, one or more of the above-listed objects is/are fulfilled by providing a glass comprising:

| | |
|---|---|
| total iron (expressed $Fe_2O_3$): | 0.01 to 0.15% |
| cobalt oxide: | 0.1 to 15 ppm |
| chromium oxide: | 0 to 10 ppm |
| titanium oxide: | 0 to 0.5% |
| glass redox: | <=0.10 |
| % FeO: | 0.0001 to 0.05% | wherein the glass has a visible transmission of at least about 85%.

In certain other example embodiments of this invention, one or more of the above-listed objects is/are fulfilled by providing a glass comprising:

| | |
|---|---|
| total iron (expressed $Fe_2O_3$): | 0.01 to 0.15% |
| glass redox: | <=0.12 |
| % FeO: | 0.0001 to 0.05% | wherein the glass has a visible transmission of at least about 85%.

DETAILED DESCRIPTION OF CERTAIN EXAMPLE EMBODIMENTS OF THE INVENTION

Glass according to certain example embodiments of this invention is capable of achieving high visible transmission while at the same time realizing fairly neutral or clear color. Glasses according to different embodiments of this invention may be used in the context(s) of architectural windows, patterned glass applications, residential windows, furniture, solar cells, and/or automotive windows.

Certain glasses according to this invention utilize soda-lime-silica flat glass as their base composition/glass. In addition to base composition/glass, a unique colorant portion is provided in order to achieve a glass that is fairly clear in color and/or has a high visible transmission. An example soda-lime-silica base glass according to certain embodiments of this invention, on a weight percentage basis, includes the following basic ingredients:

TABLE 1

EXAMPLE BASE GLASS

| Ingredient | Wt. % |
|---|---|
| $SiO_2$ | 67–75% |
| $Na_2O$ | 10–20% |
| CaO | 5–15% |
| MgO | 0–8% |
| $Al_2O_3$ | 0–5% |
| $K_2O$ | 0–5% |

Other minor ingredients, including various refining aids, such as $SO_3$, carbon, and the like may also be included in the base glass. In certain embodiments, for example, glass herein may be made from batch raw materials silica sand, soda ash, dolomite, limestone, with the use of salt cake ($SO_3$) and/or Epsom salts (e.g., about a 1:1 combination of both) as refining agents. For example, and without limitation, the glass may include from 0–1% (by weight) $SO_3$ in certain example embodiments of this invention, more preferably from 0.1 to 0.3%, still more preferably from 0.18 to 0.26%, with an example amount being 0.23%. Preferably, soda-lime-silica based glasses herein include by weight from about 10–15% $Na_2O$ and from about 6–12% CaO. While a soda-lime-silica base glass set forth above is preferred in certain embodiments of this invention, this invention is not so limited. Thus, other base glasses (e.g., borosilicate glass) may instead be employed in alternative embodiments of this invention.

In addition to the base glass (e.g., see Table 1 above), in making glass according to the instant invention the glass batch includes materials (including colorants and/or oxidizers) which cause the resulting glass to be fairly neutral in color and/or have a high visible light transmission. These materials may either be present in the raw materials (e.g., small amounts of iron), or may be added to the base glass materials in the batch (e.g., cerium, cobalt, etc.). In certain preferred embodiments, the resulting glass has visible transmission of at least 85%, more preferably at least 88%, and most preferably at least 90% (e.g., at a reference thickness of about 0.219 inches or 5.56 mm).

In certain embodiments of this invention, in addition to the base glass, the glass batch and/or final glass includes materials as set forth in Table 2 below (in terms of weight percentage of the total glass composition, unless otherwise listed as ppm in the case of cobalt):

TABLE 2

EXAMPLE COLORANTS AND OXIDIZER CERIUM

| Ingredient | General | Preferred | More Preferred | Best |
|---|---|---|---|---|
| total iron ($Fe_2O_3$): | 0.01–0.20% | 0.01–0.15% | 0.02–0.12% | 0.04 to 0.10% |
| cobalt oxide: | 0.1 to 15 ppm | 0.3 to 10 ppm | 0.5 to 5 ppm | 0.5 to 3 ppm |
| cerium oxide: | 0.005–1.0% | 0.01–1.0% | 0.01–0.5% | 0.05 to 0.2% |
| titanium oxide: | 0 to 0.5% | 0 to 0.2% | 0.001 to 0.05% | 0.01 to 0.02% |
| chromium oxide: | 0 to 10 ppm | 0 to 8 ppm | 0 to 5 ppm | 1 to 5 ppm |
| glass redox: | <=0.12 | <=0.10 | <=0.08 | <=0.05 |
| % FeO: | 0.0001–0.05% | 0.0001–0.01% | 0.001–0.008% | 0.001–0.003% |

It can be seen from the table above that small or trace amounts of titanium oxide (e.g., $TiO_2$ or other stoichiometry) and/or chromium oxide may be present in certain example instances (such amounts of titania or chromium oxide, typically referred to as colorants, may be intentionally or unintentionally provided in the resulting glass in different embodiments of this invention). It is also possible to eliminate cobalt in certain example embodiments of this invention. It should be appreciated that small amounts of other materials (e.g., refining aids, melting aids, and/or impurities) may be present (intentionally or unintentionally) in the glass such as manganese, molybdenum, tin, carbon, chlorine, zinc, zirconium, Si, sulfate, fluorine, lithium and/or strontium, without taking away from the purpose(s) and/or goal(s) of the instant invention.

It is noted that due to the small amounts of cerium oxide used, that material is not referred to as a colorant herein (instead, it acts as an oxidizer). Cerium, for example, may be added to the batch in the form of $CeO_2$, and may take the form of $Ce_2O_3$ (or any other suitable form) in the final glass. According to certain example embodiments of this invention, the presence of cerium oxide (e.g., $CeO_2$) as an oxidizer in the glass batch acts as a chemical decolorizer since during melting of the glass batch it causes iron in the ferrous state ($Fe^{2+}$; FeO) to oxidize to the ferric state ($Fe^{3+}$) as illustrated by the following equation:

$$Fe^{2+} + Ce^{4+} = Fe^{3+} + Ce^{3+} \qquad (1)$$

Equation (1) shows that the presence of cerium oxide in the glass batch causes an amount of the strong blue-green colorant of ferrous iron ($Fe^{2+}$; FeO) to oxidize into the weaker yellow-green ferric iron colorant ($Fe^{3+}$) during the glass melt (note: some ferrous state iron will usually remain in the resulting glass, as potentially may some $Ce^{4+}$). Accordingly, a significant portion of the $CeO_2$ added to the original glass batch prior to the melt is transformed during the melt into $Ce_2O_3$ which is present in the resulting glass. The aforesaid oxidation of the iron tends to reduce coloration of the glass, and does not significantly decrease visible light transmission of the resulting glass (in certain instances, this may even causes visible transmission to increase).

In order to achieve the combination of high visible transmission and fairly neutral or clear color, in certain example embodiments of this invention an oxidizing agent(s) such as cerium oxide (e.g., $CeO_2$) or the like is added to the glass batch in order to realize very oxidized conditions (i.e., to significantly lower the redox of the resulting glass). Other oxidizing agent(s) such as sulfates and/or crystalline water may be used together with or instead of cerium oxide in certain example embodiments of this invention. Thus, the glass may contain 0% cerium oxide in certain embodiments of this invention. As a result of the oxidizing agent(s) used in the batch, the iron is oxidized to a very low FeO (ferrous state) content. This is advantageous since ferrous iron ($Fe^{2+}$; FeO) is a much stronger colorant than is ferric iron ($Fe^{3+}$). The oxidizing agent(s) enables a resulting glass having a glass redox value of no greater than 0.12 (more preferably <=0.10; even more preferably <=0.08; and most preferably <=0.05) and a % FeO content (i.e., ferrous content) of from 0.0001 to 0.05% (more preferably from 0.0001 to 0.01%; most preferably from 0.001 to 0.008%). The batch redox (as opposed to the glass redox) is typically from about +2 to +20 in different example embodiments of this invention, more preferably from about +5 to +15.

In certain example embodiments of this invention, even given the above-listed ferrous content (% FeO) and low glass redox value, the glass may still realize a yellow or yellow-green coloration. In order to compensate for such coloration, a small amount of cobalt (Co) may be provided in the glass to enable the glass to realize a more neutral color in certain example embodiments of this invention. Thus, the use of the oxidizing agent(s) decolorizes (i.e., moves color more toward neutral) in a chemical fashion, and the simultaneous use of Co in certain example embodiments decolorizes in a physical fashion. This represents a significant advantage in the art, as high visible transmission and fairly neutral color may be achieved regardless of whether or not the total iron is in the very low range of 0.01 to 0.03%.

The total amount of iron present in the glass and in the colorant portion thereof is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass (i.e., glass redox). Herein, glass redox is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Iron in the ferrous state ($Fe^{2+}$; FeO) is a blue-green colorant, while iron in the ferric state ($Fe^{3+}$) is a yellow-green colorant. According to certain embodiments of this invention, the colorant portion of the glass composition herein is characterized by a redox value (i.e., $FeO/Fe_2O_3$) of no greater than 0.12 (more preferably no greater than 0.10, even more preferably no greater than 0.08 and most preferably no greater than 0.05, and sometimes no greater than 0.03) as listed above in Table 2.

Cobalt (Co) is a blue colorant, largely present in glass as $Co^{2+}$ ions. However, other oxide states of Co are also possible in glasses according to this invention. It is conventional to add cobalt colorant as $CO_3O_4$ and report its content in this form; even though this may not describe the state of oxidation of Co in the glass. Thus, unless expressly stated to the contrary, the terms cobalt oxide, CoO and $CO_3O_4$ as used herein each include not only cobalt in this/these particular oxide state(s), but also include(s) cobalt which may be present in other oxide or non-oxide state(s). Likewise, the terms cerium oxide, $CeO_2$ and $Ce_2O_3$ as used herein each include any form of cerium that may be present in the glass (or batch).

In certain example embodiments of this invention, an example colorant portion that is added to the base glass is substantially free of chromium (Cr), nickel (Ni), erbium (Er), and/or selenium (Se). In an example embodiment, the glass includes no more than about 0.005% (wt. %) Cr, more preferably no more than about 0.001% Cr, and even more preferably no more than about 0.0001% Cr. In an example embodiment, the glass includes no more than about 0.001% Se, more preferably no more than about 0.0001% Se. In an example embodiment, the glass includes no more than about 0.005% (wt. %) Ni, more preferably no more than about 0.001% Ni, and even more preferably no more than about 0.0001% Ni. In an example embodiment, the glass includes no more than about 0.01% Er, more preferably no more than about 0.001% Er, more preferably no more than about 0.0001% Er. It is noted that the term Cr includes oxides of Cr, and the terms Se, Er and Ni include respective oxides of these elements. While the glass is substantially free of Cr, Er, Ni and/or Se in certain example embodiments of this invention, the invention is not so limited unless specifically claimed.

In certain example embodiments of this invention, slag may be removed from batch and carbon used for refining purposes while further increasing cerium in the batch in order to bring FeO levels to a range of from 0.0005 to 0.00015%. Removal of slag may be used to lower ferrous content. Thus, in certain example non-limiting embodiments of this invention the batch may be substantially slag-free (or have reduced slag amounts) in order to improve quality/color/higher transmittance.

It is noted that glasses according to this invention may be made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath). Interaction between the glass and tin can affect the optical properties of a very thin layer just inside the glass in certain instances.

Glasses of this invention, as stated above, may in certain example non-limiting embodiments achieve the following color/solar characteristics characterized by high visible transmission and fairly neutral or clear coloration. In certain embodiments, glasses herein include one or more of the following color/solar characteristics when measured at an example non-limiting reference thickness of about 0.219 inches:

TABLE 3

Example Transmissive Color/Solar Characteristics

| Characteristic | General | More Preferred | Best |
|---|---|---|---|
| Lta (visible transmittance): | >=85% | >=88% | >=90% |
| UV$_{transmission}$ (% UV): | <=80% | <=75% | <=72% |
| L* (Ill. D65, 10 deg. observer): | 85–99 | 90–99 | 94–98 |
| a* (Ill. D65, 10 deg. observer): | −1.5 to +1.5 | −1 to +1 | −0.5 to +0.5 |
| b* (Ill. D65, 10 deg. observer): | −1.5 to +1.5 | −1 to +1 | −0.5 to +0.5 |
| Y(Ltc): | 85–95 | 88–92 | 89–91 |
| x | 0.2 to 0.4 | 0.25 to 0.35 | 0.30 to 0.32 |
| y | 0.2 to 0.4 | 0.25 to 0.35 | 0.30 to 0.32 |

Glasses of certain embodiments of this invention achieve the above unique characteristics (i.e., high visible transmission, high Ltc, and/or fairly neutral or clear color) through the use of the unique colorant portions and low glass redox values discussed herein. The low redox and unique colorant portions discussed herein enable the glass to achieve this combination without the need for significant amounts of Cr, Se, Ni, and/or Er.

EXAMPLES

The glasses of this invention may be made from batch ingredients using well known glass melting and refining techniques. For example, in a conventional batch technique for melting, the following base glass batch was used for the Examples herein (note: the below-listed ingredients in the batch will add up to 100% by weight once oxides thereof are accounted for; thus, they need not add up to one hundred as raw materials—fusion factor of 0.83).

TABLE 4

Base Glass for Examples

| Batch Ingredient for Base Glass | Parts by Wt. |
|---|---|
| sand | 71.5 |
| soda ash | 23.7 |
| dolomite | 18.32 |
| limestone | 6.1 |

For Examples 1–6, an experimental 100 g glass melt was made in a platinum crucible using a standard electric melting furnace set-up for soda-lime-silica composition. The melting temperature was about 1500 degrees C., the melting time was about 4 hours, the annealing temperature was about 620–680 degrees C., and an annealing time of about 0.5 hrs. was used for allowing cooling to room temperature by inertia after the annealing furnace is shut down. The glass was cast into graphite molds, annealed and cooled down, then ground and polished for visual inspection and spectral measurements. Colorants, oxidizers and other refining agent(s) (e.g., cobalt, cerium oxide, crystalline water and/or salt cake) were added to the aforesaid base glass in certain examples herein. Table 5 below sets for the colorants (and cerium from the use of cerium oxide as an oxidizer) present in the final glasses (wt. % of total glass) according to the Examples 1–6 herein, as well as certain solar/color/redox characteristics regarding the same. Lta, a*, b*, and L* were transmissive, and a*, b* and L* data were taken via Ill. D65, 10 deg. observer. Reducer(s) such as C, Si, SiO, sucrose and/or calumite were used in amounts in order to achieve batch redoxes of from +5 to +15 in different examples. The elements are listed below in terms of wt. % of the final glass (except for cobalt oxide which is listed in terms of ppm). The total iron was within the range of about 0.04 to 0.10 (wt. %) for all examples, and the precise make-up of the iron can be determined from the below-listed glass redox values and the listed % FeO values.

TABLE 5

Examples 1–6: colorants/solar properties/redox

| Element/Property | Ex. 1 | Ex. 2 | Ex. 3 | Ex. 4 | Ex. 5 | Ex. 6 |
|---|---|---|---|---|---|---|
| total iron (Fe$_2$O$_3$): | 0.04 to 0.10 (for all examples) | | | | | |
| cobalt oxide (e.g., Co$_3$O$_4$): | 1 ppm | 2 ppm | 2 ppm | 0.5 ppm | 0 ppm | 1 ppm |
| cerium oxide: | 0.1 | 0.075 | 0.06 | 0.07 | 0.06 | 0.09 |
| epsom refiner used? | yes | no | no | yes | no | yes |
| glass redox (FeO/Fe$_2$O$_3$): | 0.02 | 0.04 | 0.06 | 0.03 | 0.03 | 0.02 |
| % FeO (spectral): | 0.0013 | 0.0022 | 0.003 | 0.0018 | 0.0027 | 0.0015 |
| Lta (vis. transmission %): | 90.5 | 90.0 | 90.1 | 90.2 | 90.7 | 90.1 |
| (% UV): | 69.2 | 70.5 | 72.5 | 70.8 | 70.8 | 69.5 |
| L* (D65, 10 deg.): | 96.7 | 95.9 | 95.9 | 95.9 | 96.3 | 95.9 |
| a* (D65, 10 deg.): | −0.23 | −0.3 | −0.3 | −0.3 | −0.4 | −0.3 |
| b* (D65, 10 deg): | +0.44 | +0.02 | −0.02 | +0.3 | +0.9 | +0.6 |

TABLE 5-continued

Examples 1–6: colorants/solar properties/redox

| Element/Property | Ex. 1 | Ex. 2 | Ex. 3 | Ex. 4 | Ex. 5 | Ex. 6 |
|---|---|---|---|---|---|---|
| Y (Ltc): | 90.5 | 90.1 | 90.1 | 90.3 | 90.7 | 90.1 |
| x | 0.3105 | 0.3096 | 0.3095 | 0.3102 | 0.3111 | 0.3107 |
| y | 0.3172 | 0.3164 | 0.3164 | 0.3172 | 0.3183 | 0.3177 |

Another Example 7 according to an example embodiment of this invention is set forth below, with the amounts of the various elements being listed in terms of weight percentage as measured in the final glass (glass was about 5.6 mm thick as an example reference thickness).

TABLE 6

Example 7: colorants/solar properties/redox

| Element/Property | Ex. 7 |
|---|---|
| $SiO_2$: | 72.78% |
| $Na_2O$: | 13.55% |
| CaO: | 8.43% |
| MgO: | 4.21% |
| $Al_2O_3$: | 0.16% |
| $K_2O$: | 0.055% |
| total iron (Fe2O3): | 0.052% |
| cobalt oxide (e.g., Co3O4): | 1–2 ppm (≈0.0001 to 0.0002%) |
| cerium oxide: | 0.14 to 0.15% |
| glass redox (FeO/Fe2O3): | 0.02 |
| % FeO (spectral): | 0.0013% |
| salt cake (SO3): | 0.229% |
| $TiO_2$: | 0.016% |
| $Cr_2O_3$: | 3 ppm |
| Lta (vis. transmission %): | 90–91% |

It is noted that luminous transmittance (Lta) (2 degree observer) is understood in the art, and is used herein in accordance with its known meaning. This term is also known as Ill. A visible transmittance (380–780 nanometers inclusive), and its measurements are made in accordance with CIE Publication 15.2 (1986) and ASTM E308. The terms, and characteristics, of ultraviolet light transmittance (% UV), infrared energy transmittance (% IR), dominant wavelength (λ), total solar energy transmittance (% TS), and excitation purity (i.e. % "purity", or Pe) are also well understood terms in the art, as are their measurement techniques. Such terms are used herein, in accordance with their well known meaning, e.g., see U.S. Pat. No. 5,308,805. In particular, ultraviolet transmittance (% UV) is measured herein using Parry Moon Air Mass=2 (300–400 nm inclusive, integrated using Simpson's Rule at 10 nm intervals). IR transmittance is conventionally measured using Simpson's Rule and Parry Moon Air Mass=2 over the wavelength range 800–2100 nm inclusive at 50 nm intervals. Dominant wavelength (DW) is calculated and measured conventionally in accord with the aforesaid CIE Publication 15.2 (1986) and ASTM: E 308-90. The term "dominant wavelength" includes both the actual measured wavelength and, where applicable, its calculated complement. Excitation purity (Pe or % "purity") is measured conventionally in accordance with CIE Publication 15.2 (1986) and ASTM: E 308-90.

The glass redox is defined above. However, batch redox is different from glass redox. Batch redox is known in the art as being generally based on the following. Each component of the batch is assigned a redox number, and the batch redox is calculated as the sum total of the same. The calculations are based on the amount of a component per 2,000 kg of sand. The batch redox number is calculated before the glass is made (i.e., from the batch). A detailed discussed of how "batch redox" is determined is provided in *The redox number concept and its use by the glass technologist*, W. Simpson and D. D. Myers (1977 or 1978), the entire disclosure of which is hereby incorporated herein by reference. In contrast, as explained above, the glass redox is calculated after the glass has been made from spectral data, and is a ratio of % FeO (e.g., from a spectrum) to total iron in the glass (e.g., from chemical analysis).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A glass comprising:
a base glass portion comprising:

| $SiO_2$ | at least 67% |
|---|---|
| $Na_2O$ | 10 to 20% |
| CaO | 5 to 15% |
| MgO | 0 to 8% |
| $Al_2O_3$ | 0 to 5% |
| $K_2O$ | 0 to 5% | a colorant portion comprising:

| total iron (expressed $Fe_2O_3$): | 0.04 to 0.10% |
|---|---|
| cobalt oxide: | 0.1 to 15 ppm |
| chromium oxide: | 0 to 10 ppm |
| titanium oxide: | 0 to 0.5% |
| glass redox: | <=0.10 | wherein the glass has a visible transmission of at least about 85%, and wherein the glass contains 0% cerium oxide.

2. The glass of claim 1, wherein the glass further comprises from 0 to 0.2% titanium oxide.

3. The glass of claim 1, wherein the glass has a visible transmission of at least 88%.

4. The glass of claim 1, wherein the glass has a visible transmission of at least 90%, and a UV % transmission of no greater than about 75%.

5. The glass of claim 1, wherein the colorant portion comprises:

| cobalt oxide: | 0.3 to 10 ppm |
|---|---|
| glass redox: | <=0.08. |

6. The glass of claim 1, wherein the colorant portion comprises:

| cobalt oxide: | 0.5 to 5 ppm |
|---|---|
| glass redox: | <=0.08. |

7. The glass of claim 1, wherein the colorant portion comprises:

| | |
|---|---|
| cobalt oxide: | 0.3 to 5 ppm |
| glass redox: | <=0.05 |
| titanium oxide: | 0 to 0.2%. |

8. The glass of claim 1, wherein the glass has a UV % transmission no greater than about 75%.

9. The glass of claim 1, wherein the glass has a UV % transmission no greater than about 72%.

10. The glass of claim 1, wherein the glass is colored as follows:

| | |
|---|---|
| a* | −1 to +1 |
| b* | −1 to +1. |

11. A glass comprising:
a base glass portion comprising:

| | |
|---|---|
| SiO$_2$ | at least 67% |
| Na$_2$O | 10 to 20% |
| CaO | 5 to 15% |
| MgO | 0 to 8% |
| Al$_2$O$_3$ | 0 to 5% |
| K$_2$O | 0 to 5% | a colorant portion consisting essentially of:

| | |
|---|---|
| total iron (expressed Fe$_2$O$_3$): | 0.04 to 0.10% |
| cobalt oxide: | 0.1 to 15 ppm |
| chromium oxide: | 0 to 10 ppm |
| titanium oxide: | 0 to 0.5% | wherein the glass has a visible transmission of at least about 85%, a glass redox of no greater than 0.10, and 0% cerium oxide.

12. The glass of claim 11, wherein the glass has a visible transmission of at least 88%.

13. The glass of claim 11, wherein the glass has a visible transmission of at least 90%, and a UV % transmission of no greater than about 75%.

14. The glass of claim 11, wherein the glass has a glass redox of no greater than 0.08.

15. The glass of claim 11, wherein the glass is colored as follows:

| | |
|---|---|
| a* | −1 to +1 |
| b* | −1 to +1. |

16. A glass comprising:

| | |
|---|---|
| total iron (expressed Fe$_2$O$_3$): | 0.014 to 0.10% |
| cobalt oxide: | 0.1 to 15 ppm |
| chromium oxide: | 0 to 10 ppm |
| titanium oxide: | 0 to 0.5% |
| glass redox: | <=0.10. | wherein the glass has a visible transmission of at least about 85% and contains 0% cerium oxide.

17. The glass of claim 16, wherein the glass is colored as follows:

| | |
|---|---|
| a* | −1 to +1 |
| b* | −1 to +1. |

18. The glass of claim 16, wherein the glass is colored as follows:

| | |
|---|---|
| a* | −0.5 to +0.5 |
| b* | −0.5 to +0.5. |

19. The glass of claim 16, comprising:

| | |
|---|---|
| cobalt oxide: | 0.3 to 10 ppm |
| glass redox: | <=0.08. |

20. The glass of claim 16, comprising:

| | |
|---|---|
| cobalt oxide: | 0.5 to 5 ppm |
| glass redox: | <=0.08. |

21. The glass of claim 16, wherein the glass has a visible transmission of at least 88%.

22. The glass of claim 16, wherein the glass has a visible transmission of at least 90%, and a UV % transmission of no greater than about 75%.

23. A glass comprising a base portion, and a colorant portion consisting essentially of:

| | |
|---|---|
| total iron (expressed Fe$_2$O$_3$): | 0.04 to 0.10% |
| cobalt oxide: | 0.1 to 15 ppm |
| chromium oxide: | 0 to 10 ppm |
| titanium oxide: | 0 to 0.5% | wherein the glass has a visible transmission of at least about 85%, 0% cerium oxide, and a glass redox of no greater than 0.12.

24. The glass of claim 23, wherein the glass is colored as follows:

| | |
|---|---|
| a* | −1 to +1 |
| b* | −1 to +1. |

25. The glass of claim 23, wherein the glass is colored as follows:

| | |
|---|---|
| a* | −0.5 to +0.5 |
| b* | −0.5 to +0.5. |

26. The glass of claim 23, wherein the glass has a glass redox no greater than 0.05.

27. The glass of claim 23, wherein the glass has a visible transmission of at least 88%.

* * * * *